No. 772,108. PATENTED OCT. 11, 1904.
E. N. LONGSTRETH.
WATER HEATER.
APPLICATION FILED MAR. 9, 1904.
NO MODEL.
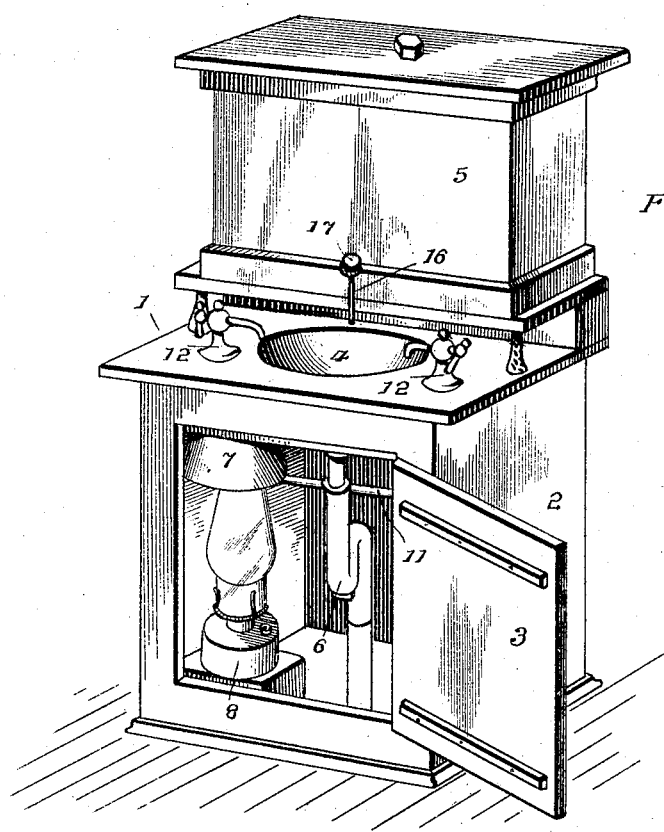
Fig. 1.
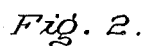
Fig. 2.
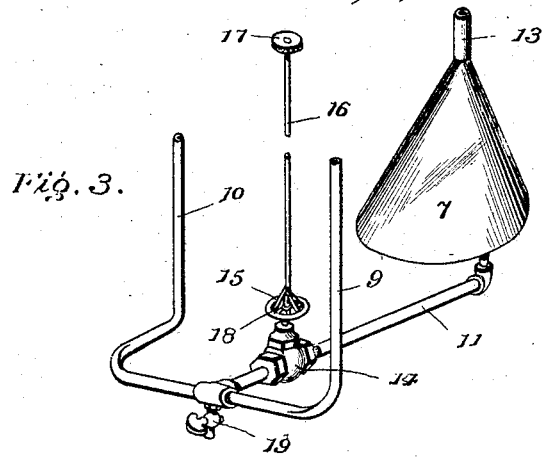
Fig. 3.
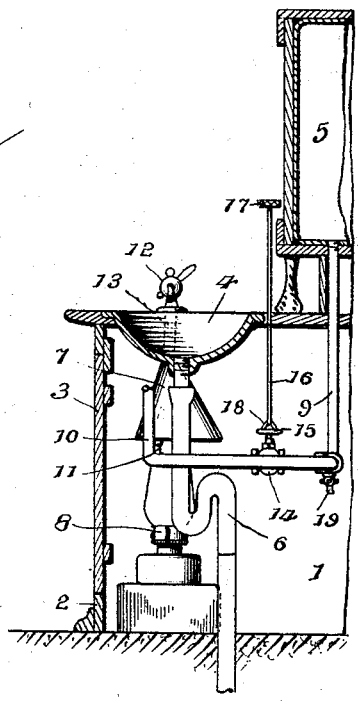
Witnesses
Inventor
E. N. Longstreth
By
Attorneys No. 772,108. Patented October 11, 1904.

UNITED STATES PATENT OFFICE.

ELIJAH N. LONGSTRETH, OF OAKWOOD, ILLINOIS.

WATER-HEATER.

SPECIFICATION forming part of Letters Patent No. 772,108, dated October 11, 1904.

Application filed March 9, 1904. Serial No. 197,302. (No model.)

*To all whom it may concern:*

Be it known that I, ELIJAH N. LONGSTRETH, a citizen of the United States, residing at Oakwood, in the county of Vermilion and State of Illinois, have invented certain new and useful Improvements in Water-Heaters, of which the following is a specification.

An object of this invention is to provide an economical means for heating water to be used in small quantities, such as is desirable in saloons and in barber-shops, in the last-mentioned instance particularly for massage and shaving purposes.

The invention consists of a cabinet supporting a supply-tank, a hot-water reservoir, and a heater for heating the water in the reservoir, which latter is supplied from the supply-tank. The invention involves peculiar connections as regards the inlets and outlets and the means for drawing off the heated water.

For a full description of the invention and the merits thereof and also to acquire a knowledge of the details of construction of the means for effecting the result reference is to be had to the following description and accompanying drawings.

While the essential and characteristic features of the invention are susceptible of modification, still the preferred embodiment of the invention is illustrated in the accompanying drawings, in which—

Figure 1 is a perspective view of my invention. Fig. 2 is a vertical sectional view. Fig. 3 is a detail perspective view of the hot-water reservoir and adjacent pipe connections.

Corresponding and like parts are referred to in the following description and indicated in all the views of the drawings by the same reference characters.

Referring to the drawings, the invention comprises a cabinet 1 of any suitable finish or style relative to the general construction thereof. The lower portion of the cabinet consists of a casing 2, to which access may be had by means of a door 3. A basin 4 is provided upon the upper portion of the casing 1, and the supply-tank 5 is disposed also upon the upper portion of the casing 2, being inclosed by the cabinet structure. Any suitable trap 6 may be used in connection with the basin within the contemplation of my invention.

Within the casing 2 is located the hot-water reservoir 7, which is preferably of conoidal shape for purposes which will appear more fully as the description proceeds. Beneath the reservoir 7 is disposed a heater 8, which may consist of a small oil-stove or a lamp for economical reasons.

Extending from the supply-tank 5 and leading down into the casing 2 is a water-supply pipe 9, from which branch the cold and hot water pipes 10 and 11, respectively. The cold-water pipe 10 extends upwardly through the casing 2, and a faucet 12 of any preferred type is secured to the upper end of the said pipe 10 to regulate the supply of the cold water. A hot-water pipe 11 extends beneath the reservoir 7, leading into the said reservoir to convey the water to be heated thereto. The inlet-pipe 11, which communicates with the reservoir 7, supplies the water which is to be heated, and an outlet-pipe 13 extends from the upper end of the reservoir 7 and leads through the casing similar to the cold-water pipe 10, the upper end of this pipe 13 being disposed adjacent the basin 4 and having the faucet 12 secured thereto.

In order to regulate the supply of the water to the reservoir 7 through the inlet-pipe 11, a valve 14 of any common type is interposed in the length of this pipe, so as to regulate the inflowing water passing from the supply-pipe 9 in a manner which will be comprehended. The valve 14 is provided with the usual operating disk handle 15, and so as to conveniently operate this valve after opening the door 3 of the casing an operating-rod 16 is extended upwardly through the casing 2 to a point adjacent the faucet 12 and the basin 4, and the upper end of this rod 16 is provided with a handle 17. The lower end of the rod 16 is formed with extensions 18, which engage the spokes of the disk 15, which forms the handle by which the valve 14 is manipulated. A drain-cock 19 is disposed adjacent the point of jointure of the inlet-pipe 11 with the supply-pipe 9, and opening of this cock will readily admit of drawing off of any sediment or accumulation in the base of the reservoir 7.

In the use of the invention the heater 8 affords the necessary heat by which the water within the reservoir 7 is kept hot. The hot-water faucet 12 is kept normally open, so as to admit of passing off of any steam which may be generated within the reservoir 7. The valve 14 is normally closed after the reservoir 7 has been filled, and should it be desired to force the heated water from the reservoir it is only necessary to operate the rod 16 and open the valve 14 to the necessary extent, when the pressure of the water within the main supply-tank 5 will force the hot water within the reservoir 7 up through the outlet-pipe 13 and thence to the hot-water faucet 12. The amount of hot water drawn from the reservoir is of course regulated by the opening movement of the valve 15 under the actuation of the rod 16, and the hot water within the reservoir will be forced therefrom by the entrance of the cold water being supplied through the inlet-pipe 11. The heated water in the reservoir 7 will of course ascend to the upper portion of the reservoir, and the above is facilitated by the conoidal shape of this part.

From the foregoing it will be noted that a supply of hot water sufficient for the desired purpose may be at all times maintained within the reservoir 7, and this at a minimum amount of expense on the part of the one using my invention.

Having thus described the invention, what is claimed as new is—

In a water-heater, the combination of a cabinet provided at its upper portion with a water-supply tank, a casing comprising the lower portion of the cabinet, a basin disposed upon the upper portion of said casing, a heater disposed within the casing, a hot-water reservoir disposed above the heater and of approximately conoidal form, a supply-pipe leading downwardly from the water-supply tank into the casing, branch pipes extended from the supply-pipe aforesaid, one of said branch pipes constituting a cold-water pipe extending upwardly through the casing to a point adjacent the basin, a faucet secured to the upper end of the cold-water pipe aforesaid, the other branch pipe extending into the lower portion of the hot-water reservoir to supply water thereto, a valve disposed in the length of the last-mentioned branch pipe, an outlet-pipe leading from the upper portion of the hot-water reservoir upwardly through the casing, a faucet secured to the outlet-pipe of the hot-water reservoir, an operating-rod extending upwardly through the casing and provided at its upper end with a handle and connected at its lower end to the valve aforesaid, and a drain-cock disposed at about the point of jointure of the branch pipes and the water-supply pipes.

In testimony whereof I affix my signature in presence of two witnesses.

ELIJAH N. LONGSTRETH. [L. S.]

Witnesses:
 E. C. HARRISON,
 CHAS. C. YOUNG.